United States Patent

[11] 3,590,853

| [72] | Inventor | Don A. Haynes |
| --- | --- | --- |
| | | Okemos, Mich. |
| [21] | Appl. No | 757,238 |
| [22] | Filed | Sept. 4, 1968 |
| [45] | Patented | July 6, 1971 |
| [73] | Assignee | FMC Corporation |
| | | San Jose, Calif. |

[54] IRRIGATION SYSTEM WITH DISALIGNMENT-SENSING DEVICE
9 Claims, 15 Drawing Figs.

| [52] | U.S. Cl. | 137/344, 239/212 |
| --- | --- | --- |
| [51] | Int. Cl. | B05b 9/02, E01h 3/02 |
| [50] | Field of Search | 239/212, 213; 137/344 |

[56] References Cited
UNITED STATES PATENTS

| 1,966,783 | 7/1934 | Balaam | 239/212 |
| --- | --- | --- | --- |
| 2,800,364 | 7/1957 | Dick et al. | 239/212 X |
| 3,202,172 | 8/1965 | Bergeron et al. | 137/344 |
| 3,245,595 | 4/1966 | Purtell | 239/212 |
| 3,281,080 | 10/1966 | Hogg | 239/212 |
| 3,385,315 | 5/1968 | Decoto et al. | 239/212 X |
| 3,394,729 | 7/1968 | Bower et al. | 137/344 |
| 3,417,766 | 12/1968 | Purtell | 239/212 X |

*Primary Examiner*—Samuel Scott
*Attorneys*—F. W. Anderson and C. E. Tripp

ABSTRACT: A plurality of spaced carriages support a long irrigation pipe and move the pipe across a field. All of the carriages are driven from a long drive shaft mounted on the carriages and made up of rigid sections connected by universal joints adjacent the carriages. Power is supplied from the drive shaft to each carriage through a speed change mechanism comprising a pair of sheaves, one of which is mounted on the drive shaft. A link straddles each universal joint and has one end connected to a movable flange of the sheave on the drive shaft. When one carriage lags or leads the other carriages, the drive shaft bends in one direction or the other at the universal joint and the link moves the flange of the sheave in one direction or the other to speed up or slow down the carriage so that the water pipe is not severely bent. The link is automatically rotated 180° when the carriages are reversed by reversal of the drive shaft so that the speed of the carriages are controlled in either direction of travel of the carriages.

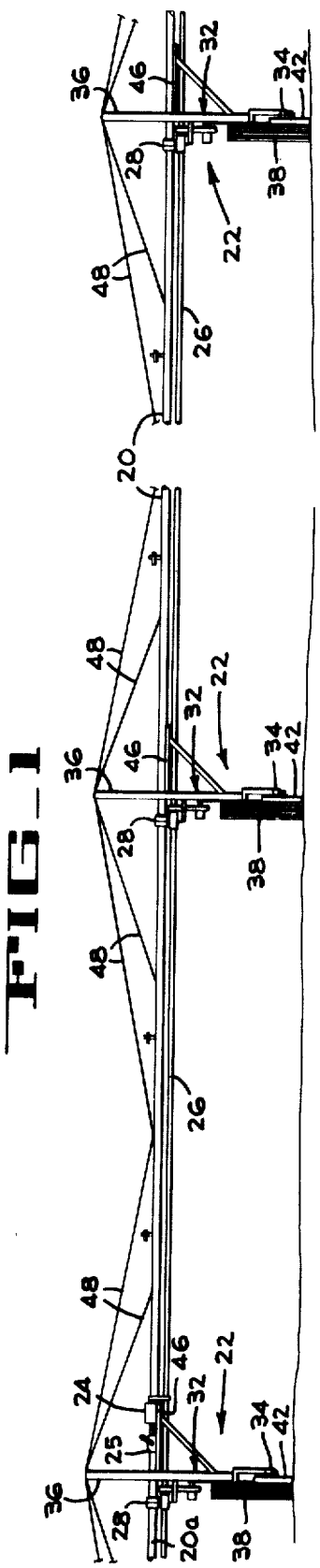

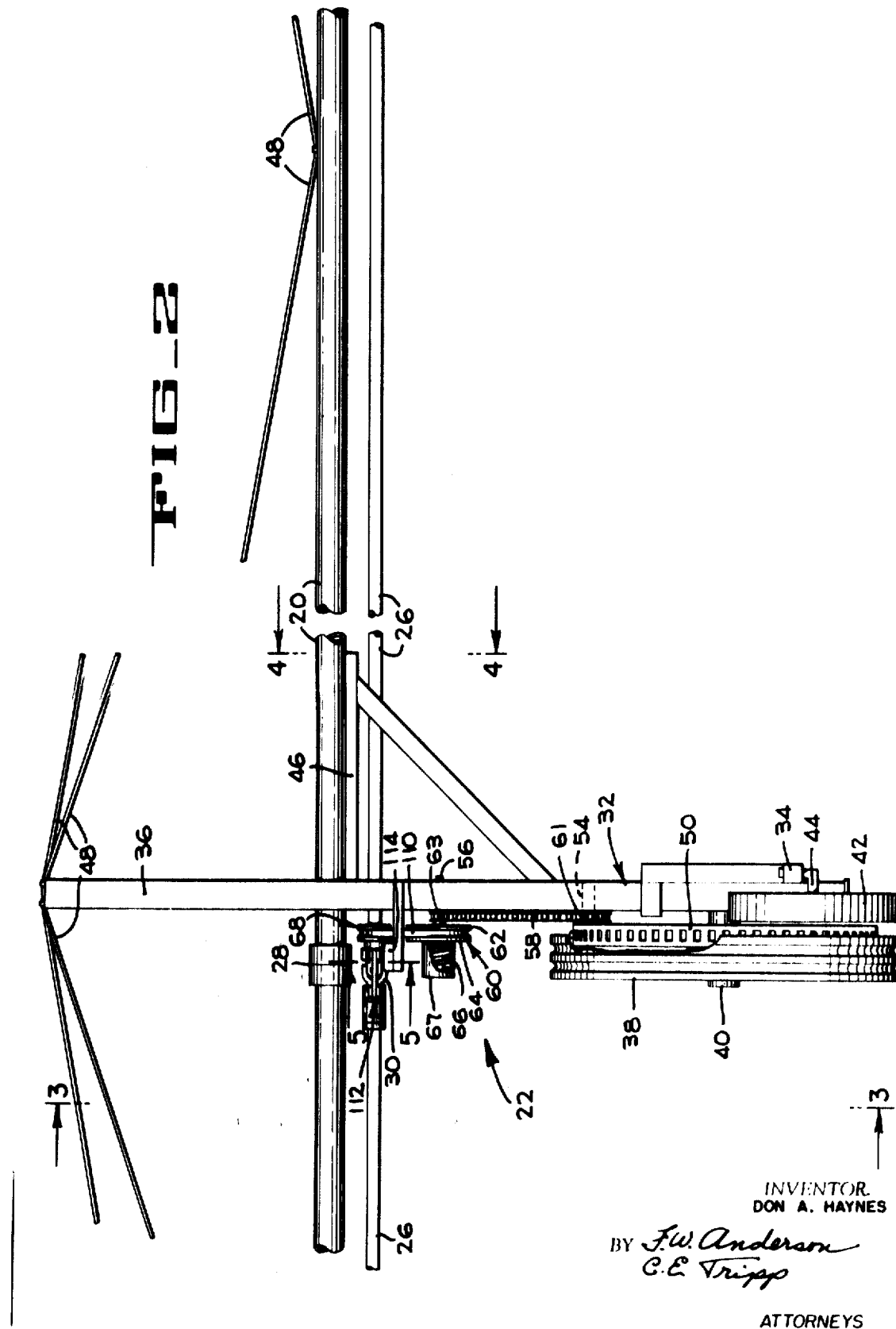

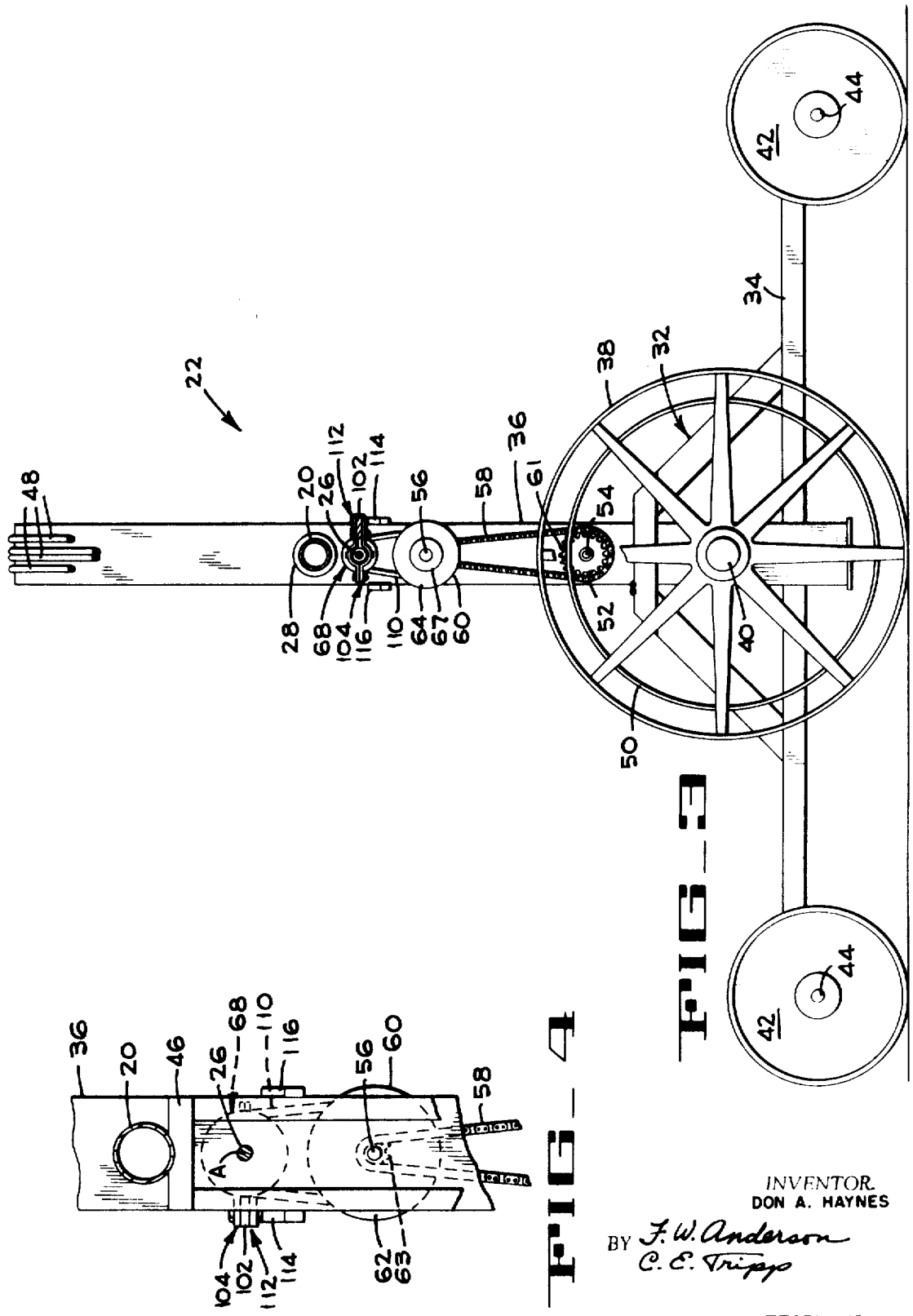

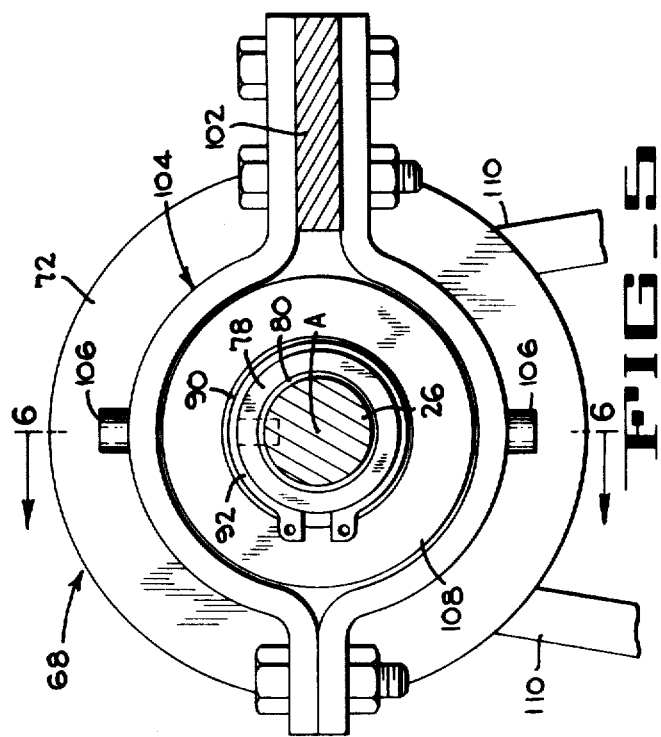
FIG_5
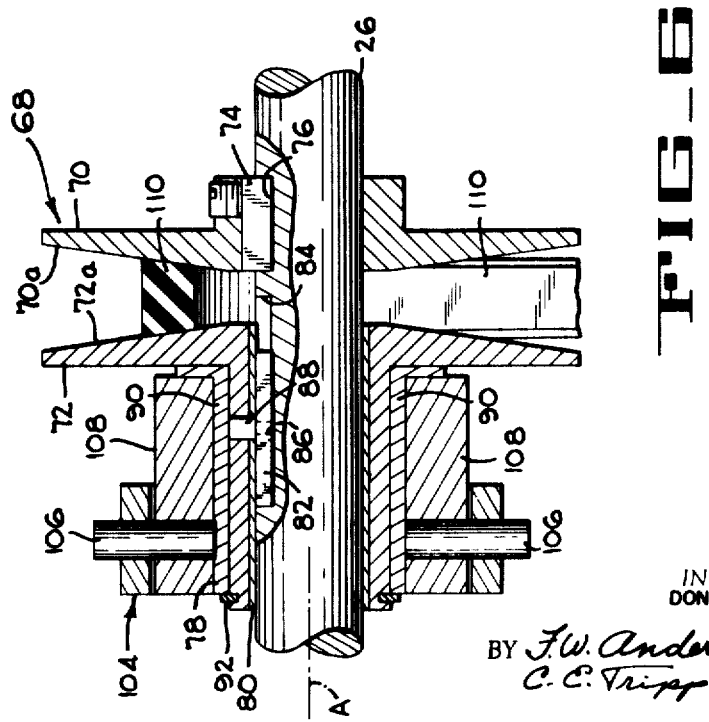
FIG_6
INVENTOR
DON A. HAYNES
BY J.W. Anderson
C. C. Tripp
ATTORNEYS

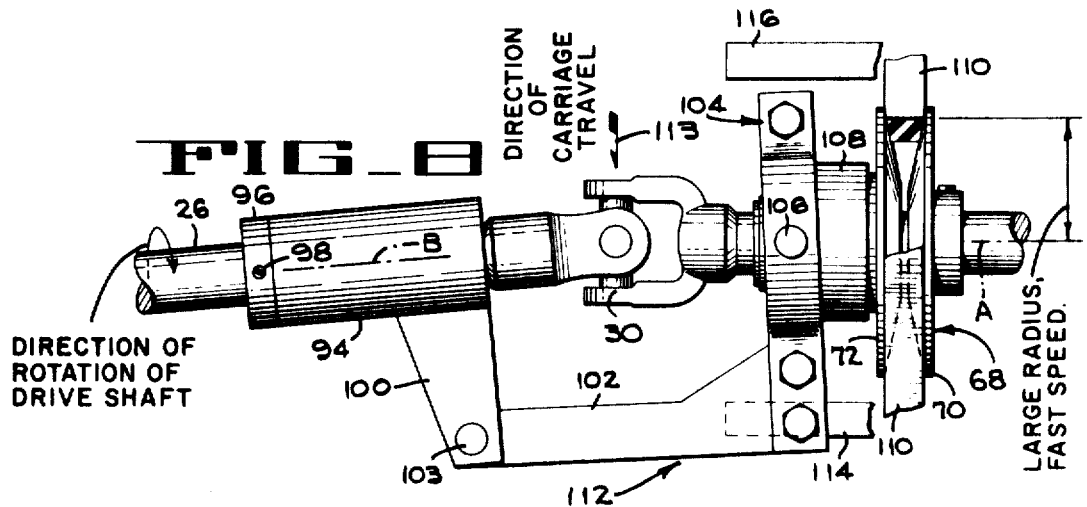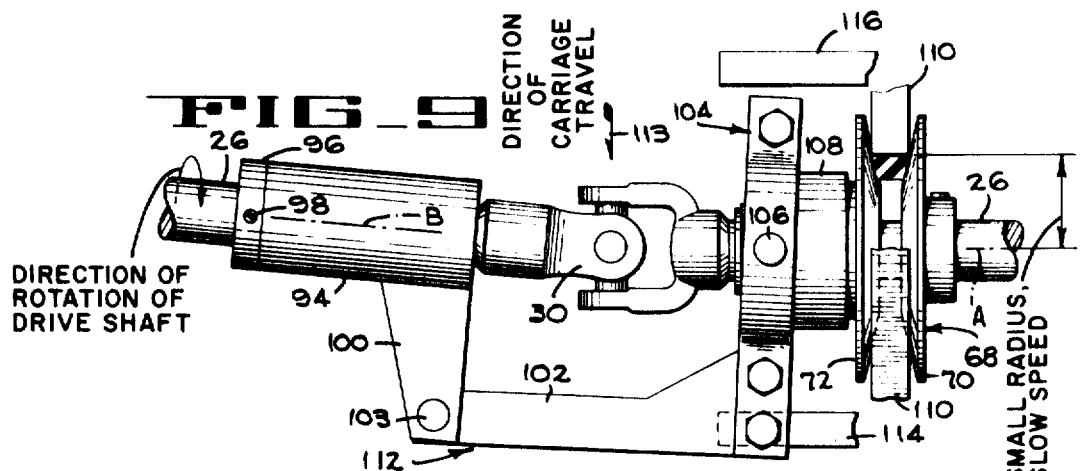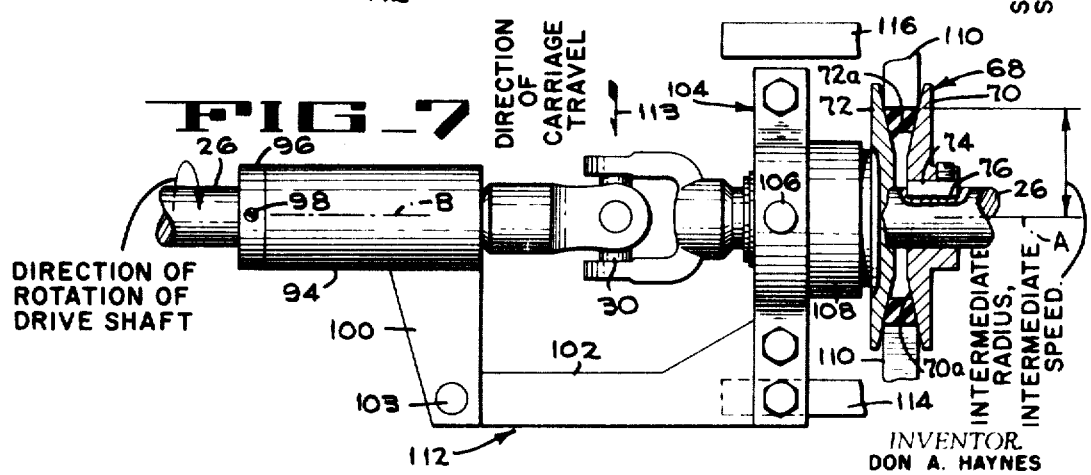

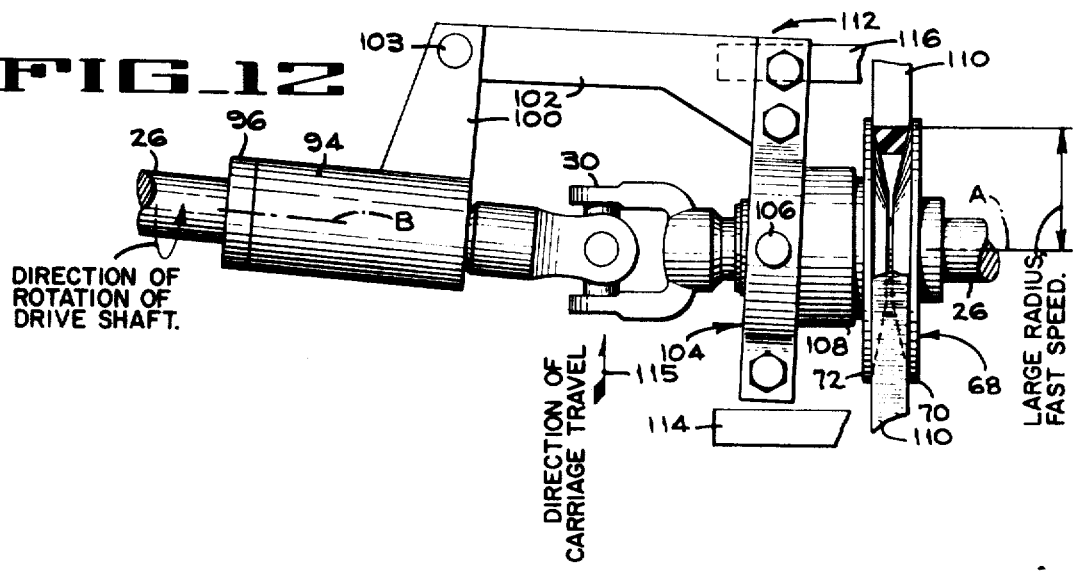
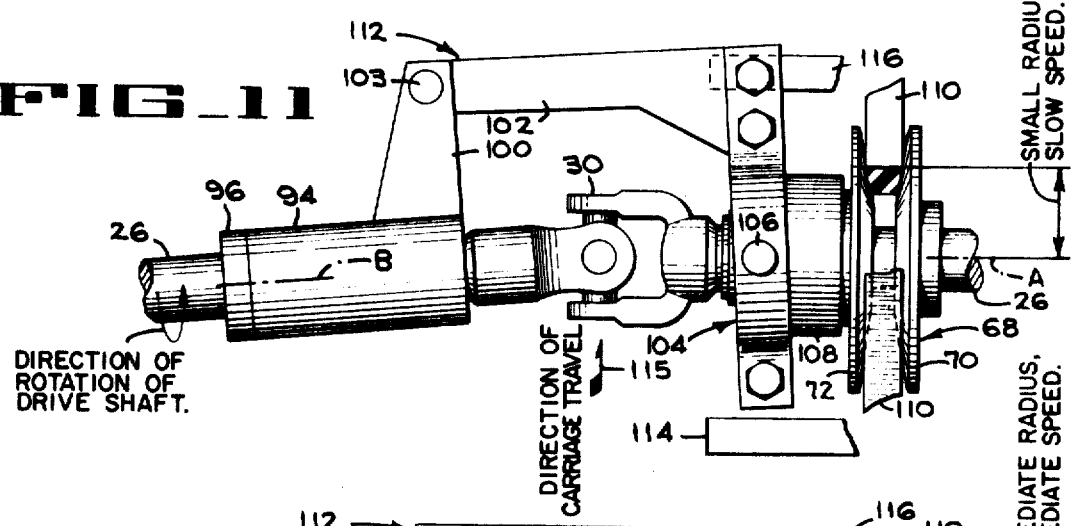
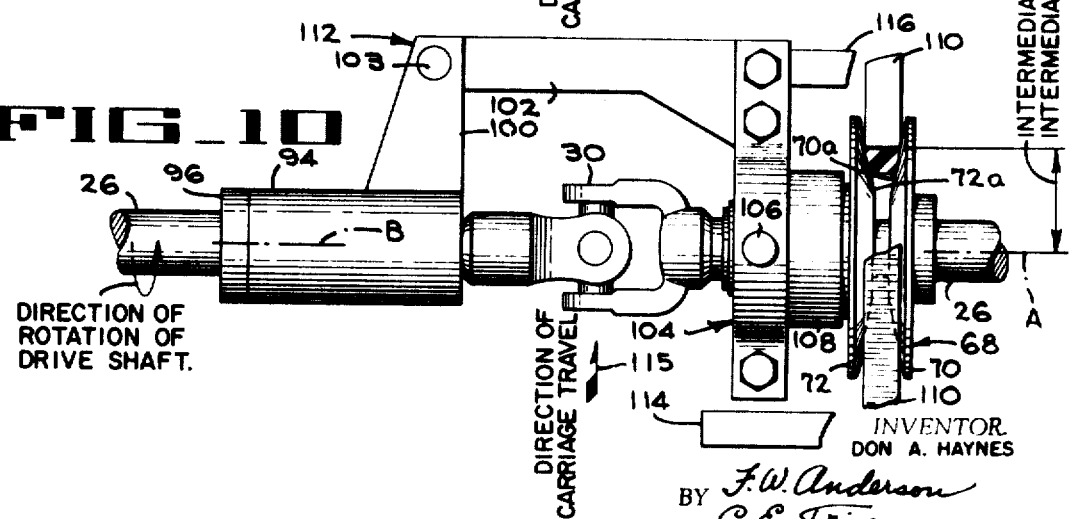

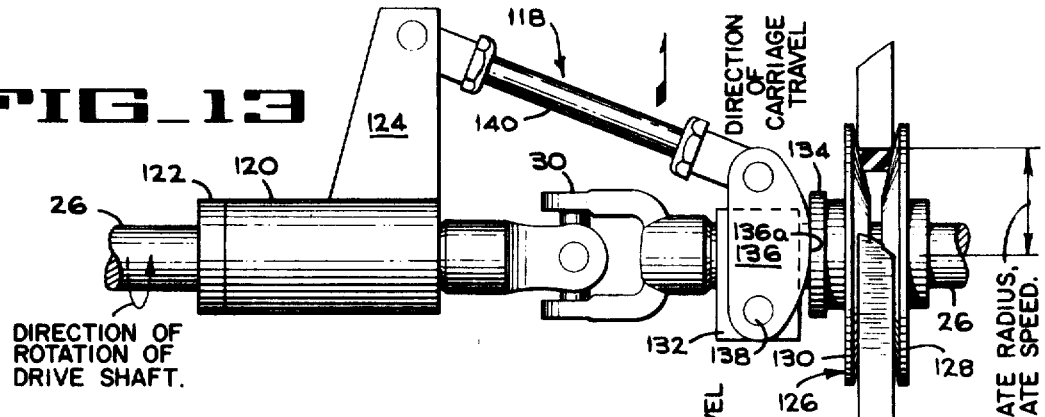
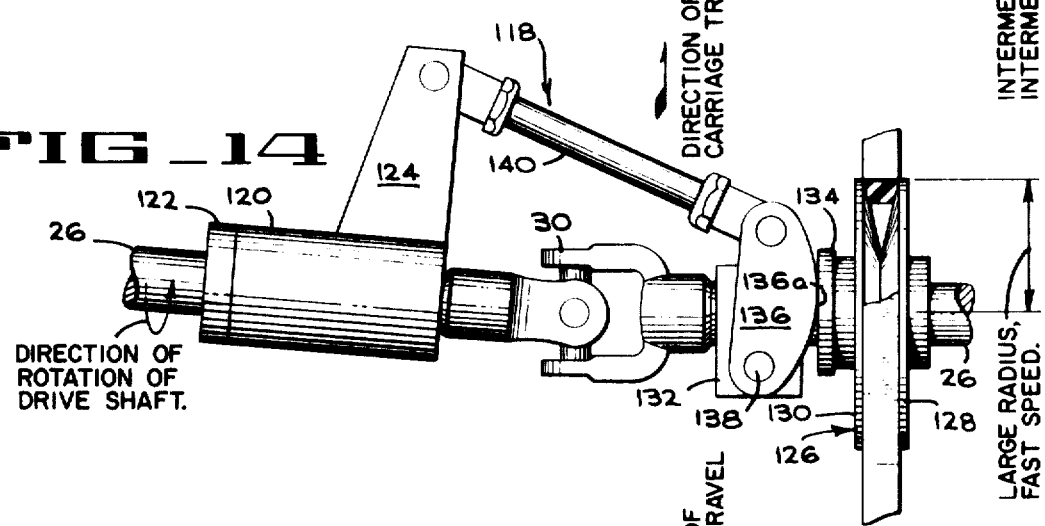
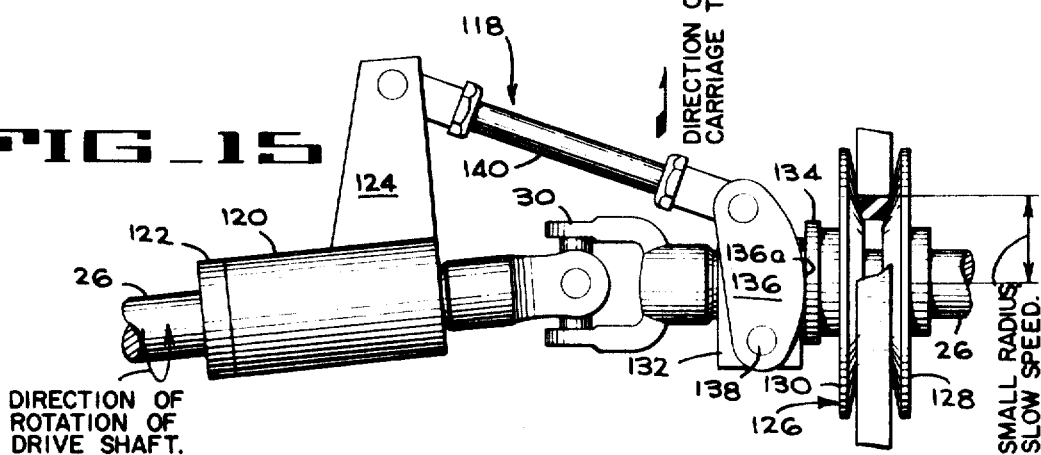

3,590,853

1

IRRIGATION SYSTEM WITH DISALIGNMENT-SENSING DEVICE

BACKGROUND OF THE INVENTION

The present invention relates to irrigation systems, and, more particularly to an irrigation system with a water pipe carried by a plurality of carriages, the speeds of which are automatically controlled to keep the pipe reasonably straight.

Pipes for irrigating fields are sometimes carried on a plurality of carriages for movement across a field as water is dispersed from the pipe. The several carriages supporting a pipe should move at substantially the same speed so that the pipe will not bend. Generally, the speed of the individual carriages is adjustable so that equal speeds can be maintained for the carriages carrying a pipe. Although it is known to change the speed of a leading or lagging carriage automatically, usually the change of speed of a carriage, when required, has been effected by the operator of the irrigation system.

SUMMARY OF THE INVENTION

In the present invention, an improved irrigation system is provided in which each one of the carriages carrying the irrigation pipe is automatically controlled by simple, compact, effective mechanism to maintain the pipe reasonably straight. In the preferred form of the invention, an elongated drive shaft, driven by a motor mounted on one of the carriages, is supported by the carriages parallel to the pipe. The rotatable drive shaft has separate sections joined together by universal joints, one at each carriage. A speed change mechanism comprising an adjustable sheave is mounted on the drive shaft adjacent each joint. Each sheave is connected by belt drive to another sheave, which is mounted on the carriage and connected to the drive wheel thereof. One end of a speed control member, or link, is mounted on the drive shaft adjacent each joint and opposite the speed change mechanism. The link extends across the joint and is connected to the movable flange of the adjustable sheave. If one carriage leads or lags adjacent carriages, the drive shaft bends in one direction or the other at the joint and the link shifts the moveable sheave flange in one direction or the other to slow down or speed up the carriage to bring the carriage back into line with the other carriages.

The link is rotatably mounted on the drive shaft and a stop holds the link in the plane of the drive shaft forward of the leading edge thereof as the carriage moves in one direction. When the carriage leads adjacent carriages and the universal joint advances, the sheave, which has inclined the flange walls, is opened to decrease the radius of the sheave and slow the carriage. When the carriages lags adjacent carriages and the universal joint lags, the sheave is closed to increase the radius of the sheave and speed up the carriage. When the drive shaft rotates in the opposite direction to drive the carriages in the opposite direction, the link rotates 180° to another stop so that the link is again in the plane of the drive shaft forward of the leading edge thereof. Thus, the speed control link is automatically set in accordance with the direction of travel of the carriages to automatically control the speed change mechanism of the carriages and maintain the water pipe straight.

It is accordingly one object of the present invention to provide an improved irrigation system with simple, compact, effective mechanism to control the speed of the individual carriages carrying the irrigation pipe to maintain the pipe straight. It is another object of the present invention to provide mechanism to control automatically the speed of the carriage in an irrigation system, which mechanism automatically resets for change of direction of carriage travel.

BRIEF DESCRIPTION OF THE DRAWINGS

FIG. 1 is a fragmentary view in elevation of an irrigation system incorporating the present invention;

FIG. 2 is an enlarged view, taken as the view of FIG. 1, of one of the carriages of the irrigation system of FIG. 1;

FIG. 3 is a view taken on the line 3-3 of FIG. 2;

2

FIG. 4 is an enlarged view taken on the line 4-4 of FIG. 2;

FIG. 5 is an enlarged view taken on the line 5-5 of FIG. 2;

FIG. 6 is a view taken on the line 6-6 of FIG. 5;

FIGS. 7, 8, and 9 are plan views of the speed change mechanism and speed control link as the carriages move in one direction;

FIGS. 10, 11 and 12 are views similar to the views of FIGS. 7, 8, and 9, except that the carriages are moving in the opposite direction from their direction of movement in FIGS. 7, 8, and 9; and FIGS. 13, 14, and 15 are plan views of the speed change mechanism and a modified form of speed control link.

Description of the Preferred Embodiments

There is shown in FIG. 1 an irrigation system having an elongated water pipe 20, one end 20a of which is connected to a source of water (not shown). The water pipe is supported on a plurality of carriages 22 for movement across a field in a direction normal to the pipe. One of the carriages has a motor 24 mounted thereon which has an output shaft mechanically connected to a drive shaft 26. The motor 24 is hydraulically connected to water pipe 20 through a hydraulic valve 25 which is manually operable to direct the pressure fluid from pipe 20 to one side or the other of the motor 24 to rotate the motor in one direction or the other. The reversible motor rotates the drive shaft selectively in one direction or the other to drive the carriages in one direction or the other and move the pipe in one direction (into the plane of the paper in FIG. 1) or the other direction (out of the plane of the paper).

The water pipe 20 is made up of a plurality of sections which are joined at flexible joints 28 adjacent each carriage. The drive shaft 26 is also made up of a plurality of sections which are joined by universal joints 30 (see FIG. 7) adjacent each carriage.

As shown best in FIGS. 2 and 3, each carriage 22 has a frame 32 with a horizontal base member 34 and a vertical standard 36 connected to the base member. A drive wheel 38 is mounted on an axle 40 secured in standard 36, and two stabilizing wheels 42 are mounted on axles 44 secured to the ends of the base member 34. The drive shaft 26 is journaled in standard 36, and the water pipe 20 which passes through an opening in standard 36, is supported by a cradle 46 secured to standard 36. Guy wires 48, having one end secured to the top of each standard 36, have the opposite ends secured to the water pipe 20 to help support the pipe.

The drive wheel 36 has a circular rack 50 mounted thereon. A pinion 52, which is engaged with rack 50, is secured on a shaft 54 journaled in standard 36. Another shaft 56 journaled in the standard is connected to shaft 54 by means of a drive chain 58 received on sprockets 61, 63 which are secured, respectively, on shafts 54 and 56. Shaft 56 has a spring urged adjustable sheave 60 mounted thereon. Sheave 60 has a fixed flange 62 secured to shaft 56 and a movable flange 64 keyed to shaft 56. The movable flange 64 is urged by spring 66, which is mounted in a case 67 secured to the shaft, toward the fixed flange. Both flanges have inner walls which slope toward the opposite flange as they extend inwardly toward the shaft 56.

As shown in FIG. 7, an adjustable sheave 68 is mounted on drive shaft 26 adjacent each universal joint 30. The sheave 68 has two flanges, a fixed flange 70 and a movable flange 72, both with inner walls 70a and 72a which slope toward the opposite flange as they extend inwardly toward the drive shaft, like the flanges of sheave 60. As shown best in FIG. 6, the fixed flange 70 is secured to the drive shaft by means of key 74, which is snugly received in slot 76 on the shaft. The moveable flange 72, which has a neck 78, is received on a bushing 80. The bushing 80 is slidably received on the drive shaft 26 over a key 82. The key 82 is received in an elongated slot 84 for limited movement toward and away from the fixed flange 70. The key 82 has a hole 86 which receives a pin 88. The pin 88 extends through a hole in bushing 80 and into a hole in neck 78. A bearing 90, received on neck 78 and held thereon by snap-ring 92, holds the pin 88 in hole 86 of the key 82. Thus, the moveable flange 72 can slide toward and away from the fixed flange 70 but cannot rotate relative to drive shaft 26.

As shown in FIG. 7, a bushing 94 is mounted on drive shaft 26 on the opposite side of the universal joint 30 from the adjustable sheave 68. The bushing, which is rotatable relative to the shaft, is received between the universal joint 30 and a collar 96 locked to the shaft by set screw 98. Two spaced apart arms 100 are secured to the bushing and extend outwardly from the drive shaft 26. A link 102 is pivotally received on pin 103 extending between the ends of the arms 100. The link 102 extends parallel to drive shaft 26 and across the universal joint 30. A yoke 104 (see FIG. 5) secured to the end of link 102 is pivotally connected, by pins 106, to a bushing 108 which is tightly received on bearing 90 (see FIG. 6). Thus movement of yoke 104 toward or away from the fixed flange 70 of the sheave 68 will move the moveable flange toward or away from the fixed flange 70.

A drive belt 110 is received on sheaves 68 and 60 which lie in the same plane. The belt 110 will describe a circular arc in sheave 68 having a center in central axis A of shaft 26 and of a radius depending on the axial position (that is, the position along shaft 26) of the moveable flange of the sheave. If the sheaves 70, 72 are close together, the radius of the belt at sheave 68 will be large; if the sheaves 70, 72 are spread apart, the radius of the belt at sheave 68 will be small. Since the endless belt is of fixed length, the axial position of the moveable flange 64 (that is, the position on shaft 56) of sheave 60 is determined by the radius of the belt in sheave 68. When the radius of the belt at sheave 68 is large, the moveable flange 64 will be moved by belt 110 against the bias of spring 66 away from the fixed flange to decrease the radius of the belt around shaft 56. When the radius of the belt around shaft 26 decreases, the moveable flange 64 of sheave 60 will be moved toward the fixed flange 62 by spring 66 to increase the radius of the belt around shaft 56. Thus, the adjustable sheave 68 on drive shaft 26 defines a speed change mechanism through which the drive shaft 26 transmits power to the drive wheel of the carriage. As shown best in FIG. 2, this power is transmitted through sheave 68, belt 110, sheave 60, shaft 56, sprocket 63, chain 58, sprocket 61, shaft 54, pinion 52, and circular rack 50.

The arms 100, link 102, and yoke 104, which are connected, define a speed control member 112 which actuates the speed change mechanism in response to bending of drive shaft 26 at joint 30 to slow down or speed up the carriage 22. When the drive shaft 26 is rotating counterclockwise when looking in from the right end of FIG. 7, the carriage will be traveling in the direction indicated by the arrow 113 in FIG. 7. The speed control member 112 will rotate with shaft 26 counterclockwise until contacting a stop 114 mounted on standard 36 of frame 32, as shown in FIG. 4. The stop 114 holds the link 102 in the horizontal plane of the drive shaft and spaced forwardly of the leading, or forward, edge of the drive shaft.

When all the carriages are traveling the same speed, the water pipe will be straight and the central axis A of one shaft section will be coaxial with the central axis B of an adjacent shaft section, as shown in FIG. 7. At this time, the radius of the belt 110 on sheave 68 is of intermediate size. When one (as shown in FIG. 8) or both sections of the drive shaft bend forwardly from the joint 30, it indicates that the carriage at the joint 30 is lagging the next joint 30. The speed control member 112 shifts the moveable flange 72 of sheave 68 toward the fixed flange 70 thereof. This increases the radius of the belt 110 on sheave 68 and decreases the radius of the belt on sheave 60. The changes of belt radius on the sheaves 68 and 60 increases the speed of the carriage adjacent the joint 30 to permit the carriage to catch up with the adjacent carriage to bring the water pipe 20 back into a straight line.

When one (as shown in FIG. 9) or both sections of pipe bend rearwardly from the joint, it indicates that the carriage at the joint 30 is leading the next joint 30. The speed control member 112 shifts the moveable flange 72 of sheave 68 away from the fixed flange 70 thereof. This decreases the radius of belt 110 on sheave 68, and increases the radius of the belt 110 on sheave 60. The changes of belt radius on the sheaves 68 and 60 decrease the speed of the carriage adjacent the joint to slow the carriage down until adjacent carriages catch up to bring the water pipe back into a straight line.

When the drive shaft 26 is rotated in the opposite direction (clockwise as viewed from the right side of FIG. 10), the carriage is moved in the opposite direction as indicated by the arrow 115 in FIG. 10. Under these conditions, the speed control member 112 rotates clockwise (as viewed in FIG. 4) until contacting stop 116 which is mounted on standard 36 of frame 32. The stop 116 holds the link 102 in the horizontal plane of the drive shaft and spaced forwardly of the leading, or forward edge of the drive shaft. Thus, by the automatic reversal of the speed control member 112 on reversal of the drive shaft and reversal of the carriages, the speed control member 112 remains effective to actuate the speed change mechanism in the same manner as previously described in conjunction with FIGS. 7, 8, and 9. In FIG. 11, one section of shaft 26 is bent rearwardly from the joint 30, indicating that the carriage at the joint is leading an adjacent carriage. The speed control member 112 opens the sheave to reduce the speed of the carriage. Conversely, in FIG. 12, one section of shaft 26 is bent forwardly from the joint 30 to indicate the carriage at the joint is lagging an adjacent carriage. The speed control member 112 closes the sheave to increase the speed of the carriage.

There is shown in FIGS. 13, 14, and 15 a different version 118 of speed control member. The speed control member 118 has a bushing 120 rotatably mounted on drive shaft 26 between a locking collar 122 and universal joint 30. Lever arms 124 extend outwardly from the bushing. A sheave 126 has a fixed flange 128 mounted on shaft 26 and a moveable flange 130 keyed to shaft 26 but axially moveable thereon. A bushing 132 is rotatably mounted on shaft 26 between the universal joint 30 and a thrust washer 134 on the moveable flange 130 of sheave 126. A cam 136 is pivotally connected at one end by pin 138 to the outer side of bushing 132. The opposite end of the cam is pivotally connected to one end of a link 140, the opposite end of which is pivotally connected between the ends of arms 124. The cam has an arcuate edge 136a for engagement with thrust washer 134. The speed control member 118, like speed control member 112, rotates between the two stops 114 and 116 when the direction of drive shaft rotation is reversed so that the link always lies in the horizontal plane of the drive shaft spaced from the leading edge thereof as shown in FIGS. 13, 14, and 15. When a shaft section bends forwardly from the joint 30, as shown in FIG. 14, indicating that the carriage at that joint is lagging, the cam is turned clockwise about pivot pin 138 to urge edge 136a against the thrust washer and close the sheave. This increases the speed of the carriage to straighten the pipe and shaft. When a shaft section bends rearwardly from the joint 30, as shown in FIG. 15, indicating that the carriage at that joint is leading, the cam is turned counterclockwise about pivot pin 138 to permit the sheave to expand and decrease the speed of the carriage.

Although the best mode contemplated for carrying out the present invention has been herein shown and described, it will be apparent that modification and variation may be made without departing from what is regarded to be the subject matter of the invention as set forth in the appended claims.

Having completed a detailed description of the invention so that those skilled in the art could practice the same, I claim:

1. In an irrigation system having an elongated water pipe, the combination comprising:
   a. a carriage to support the pipe,
   b. a shaft supported by the carriage and extending parallel to said pipe, said shaft having two connected sections and having a joint between said sections,
   c. a speed change mechanism mounted on one section of the shaft, said speed change mechanism operable when actuated to alter the speed of the carriage, d. a link having one end mounted on the other section of the shaft, said link extending across the joint to the speed change mechanism to actuate said mechanism in response to relative movement between the link and the shaft due to bending of the shaft at the joint, e. means to rotate the shaft in one direction and the other to move the carriage in one direction and the other, said link angularly shifting from one side of the shaft to the other on each reversal of rotation of the shaft to actuate the speed change mechanism in accordance with the direction of movement of the carriage.

2. The mechanism of claim 1 in which said carriage has a drive wheel and in which said speed change mechanism includes a sheave having flanges with internal inclined faces, one of said flanges secured in fixed axial position on the shaft and the other flange shiftable axially on the shaft in response to relative movement between the link and the shaft due to bending of the shaft at the joint, and in which means including a belt received on the sheave connects said speed change mechanism to the drive wheel.

3. In an irrigation system having an elongated water pipe, the combination comprising:

a. a plurality of carriages to support the pipe, b. a shaft to drive the carriages, said shaft supported by the carriages and extending parallel to said pipe, said shaft having a plurality of connected sections and having joints between said sections, at least some of said joints adjacent carriages, c. a speed change mechanism for each carriage, each speed change mechanism mounted on a section of shaft adjacent a joint at one of the carriages, each speed change mechanism operable when actuated to alter the speed of a carriage, and d. a link for each carriage, each link having one end mounted on a section of shaft adjacent a joint and on the opposite side thereof to each speed change mechanism, each link extending across the joint to the speed change mechanism to actuate said mechanism in response to relative movement between the link and the shaft due to bending of the shaft at the joint, the link for each speed change mechanism rotatably mounted on the shaft and angularly turned to a first predetermined position with respect to the shaft when the shaft rotates in one direction to drive the carriages in one direction, said link angularly turning to a second predetermined position with respect to the shaft when the shaft rotates in the opposite direction to drive the carriages in the opposite direction.

4. In an irrigation system having an elongated water pipe, the combination comprising:

a. a plurality of carriages to support the pipe, b. a rotatable drive shaft supported by the carriages and extending parallel to said pipe, said shaft having a plurality of sections connected at joints, c. a speed change mechanism for each carriage, each speed change mechanism connected to the shaft, d. means connecting each speed change mechanism to a carriage to run the carriage in one direction or the other on rotation of the drive shaft in one direction or the other, each speed change mechanism operable when actuated in one direction to increase the speed of the carriage and operable when actuated in the opposite direction to decrease the speed of the carriage, and e. a pair of stops mounted adjacent the shaft, f. a speed control member rotatably mounted on the shaft and angularly shiftable between said stops in accordance with the direction of rotation of said shaft, said speed control member operable in one position to actuate the speed change mechanism in one direction in response to bending of the shaft in one direction at a joint adjacent the carriage and to actuate the speed change mechanism in the opposite direction in response to bending of the shaft in the opposite direction at said joint, said speed control member operable in the opposite position to actuate the speed change mechanism reversely.

5. In an irrigation system having an elongated water pipe, the combination comprising:

a. a plurality of carriages to support the pipe, b. a shaft supported by the carriages and extending parallel to said pipe, said shaft having a plurality of connected sections and having joints between said sections, each joint adjacent a carriage, c. a speed change mechanism for each carriage, each speed change mechanism mounted on a section of shaft adjacent a joint, each speed change mechanism operable when actuated in one direction to increase the speed of the carriage and operable when actuated in the opposite direction to decrease the speed of the carriage, and d. a link for each carriage, each link having one end mounted on a section of shaft adjacent a joint and on the opposite side thereof to each speed change mechanism, each link extending across the joint to actuate said mechanism to increase the speed of the carriage adjacent the joint in response to relative movement in one direction between the link and the shaft due to bending of the shaft in one direction at the joint and to actuate said mechanism to decrease the speed of the carriage adjacent the joint in response to relative movement in the other direction between the link and the shaft due to bending of the shaft in the other direction at the joint, said links angularly shiftable on the shaft on reversal of the carriages to reversely actuate the speed change mechanisms.

6. In an irrigation system having an elongated water pipe, the combination comprising:

a. a plurality of carriages to support the pipe, each carriage having a drive wheel, b. a rotatable drive shaft supported by the carriages and extending parallel to said pipe, said shaft having a plurality of connected sections and having universal joints between said sections, each joint adjacent a carriage, c. a speed change mechanism for each carriage, each speed change mechanism connected to a section of shaft adjacent a joint, d. means connecting each speed change mechanism to a carriage drive wheel to run the carriage in one direction or the other on rotation of the drive shaft in one direction or the other, each speed change mechanism operable when actuated in one direction to increase the speed of the carriage and operable when actuated in the opposite direction to decrease the speed of the carriage, e. a pair of stops mounted adjacent the drive shaft, f. a link for each carriage, each link having one end rotatably mounted on a section of shaft adjacent a joint and on the opposite side thereof to each speed change mechanism, each link angularly shiftable to one position against one stop when the shaft is rotated in one direction and angularly shiftable to an opposite position against the other stop when the shaft is rotated in the direction, said link when in one position extending across the joint to actuate said speed change mechanism in one direction in response to relative movement in one direction between the link and the shaft due to bending of the shaft in one direction at the joint and to actuate said speed change mechanism in the opposite direction in response to relative movement in the opposite direction between the link and the shaft due to bending of the shaft in the opposite direction at the joint, said link when in the opposite position actuating said speed change mechanism reversely to the actuation when in said one position 7. In an irrigation system having a plurality of carriages and having an elongated member supported by the carriages, said member rotatable in one direction as the carriages move in one direction and rotatable in the opposite direction as the carriages move in the opposite direction, a speed control member rotatably mounted on said elongated member, means to arrest rotation of said speed control member in a first fixed angular position on one side of the elongated member and in the horizontal plane of the elongated member as the elongated member rotates in one direction and to arrest rotation of said speed control member in a second fixed angular position on the opposite side of the elongated member and in the horizontal plane of the elongated member as the elongated member rotates in the opposite direction, said speed control member in said first fixed angular position operable in response to bending of the elongated member in one direction in the horizontal plane to slow the speed of the carriages and in response to bending of the elongated member in the opposite direction in the horizontal plane to increase the speed of the carriages, said speed control member in said second fixed angular position operable in response to bending of the elongated member in said one direction in the horizontal plane to increase the speed of the carriages and in response to bending of the elongated member in the opposite direction in the horizontal plane to decrease the speed of the carriages.

8. In an irrigation system having a plurality of carriages and having a water pipe carried by the carriages, a drive shaft rotatable in one direction to drive the carriages in one direction and rotatable in the opposite direction to drive the carriages in the opposite directions, a speed control member rotatably mounted on said shaft, a first stop to arrest rotation of said speed control member in a first fixed angular position in the horizontal plane of the shaft and in a predetermined relation relative to the shaft with respect to the direction of movement of the carriages as the shaft rotates in one direction to move the carriages and the shaft thereon in one direction, a second stop to arrest rotation of said speed control member in a second fixed angular position and in the horizontal plane of the shaft and in said predetermined relation relative to the shaft with respect to the direction of movement of the carriages as the shaft rotates in the opposite direction to move the carriages and the shaft thereon in the opposite direction, said control member responsive to bending of the shaft in the horizontal plane in one direction relative to the direction of motion of the carriages to slow the speed of the carriages and responsive to bending of the shaft in the horizontal plane in the opposite direction relative to the direction of motion of the carriages to increase the speed of the carriages.

9. In an irrigation system having a water pipe and a plurality of reversible carriages to support the water pipe, rotating drive means, means for continuously rotating said drive means in one direction for driving said carriages in such one direction and for continuously rotating said drive means in the opposite direction for driving said carriages in such opposite direction, speed control means rotatably mounted on said drive means, a pair of fixed stop members on said carriage alternately engaged by said speed control means for positioning the same in fixed angular positions depending upon the direction of rotation of said drive means, said speed control means being constructed and arranged on said drive means for automatic reversing movement from one fixed stop to the other upon rotation of said drive means in the opposite direction, thereby to condition said speed control means for controlling said carriages as they move in said opposite direction.

FO-1050
(5/69)

UNITED STATES PATENT OFFICE
CERTIFICATE OF CORRECTION

Patent No. 3,590,853  Dated July 6, 1971

Inventor(s) Don A. Haynes

It is certified that error appears in the above-identified patent and that said Letters Patent are hereby corrected as shown below:

Col. 1, line 41, change "moveable" to --movable--; line 50, change "carriages" (first occurrence) to --carriage--.

Col. 6, line 54, before "direction" insert --opposite--.

Signed and sealed this 16th day of May 1972.

(SEAL)
Attest:

EDWARD M. FLETCHER, JR.
Attesting Officer

ROBERT GOTTSCHALK
Commissioner of Patents